United States Patent
Lee et al.

(10) Patent No.: US 9,423,883 B2
(45) Date of Patent: Aug. 23, 2016

(54) ELECTRONIC APPARATUS AND METHOD FOR DETERMINING VALIDITY OF TOUCH KEY INPUT USED FOR THE ELECTRONIC APPARATUS

(71) Applicant: Samsung Electronics Co., Ltd., Gyeonggi-do (KR)

(72) Inventors: Sang-Yup Lee, Daegu (KR); Hark-Sang Kim, Seoul (KR); Jung-Won Kim, Gyeonggi-do (KR); Jong-Dae Park, Seoul (KR); Yeon-Hwan Kim, Gyeongsangbuk-do (KR); Hyong-Rae Cho, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 271 days.

(21) Appl. No.: 14/132,160

(22) Filed: Dec. 18, 2013

(65) Prior Publication Data
US 2014/0192014 A1 Jul. 10, 2014

(30) Foreign Application Priority Data
Jan. 4, 2013 (KR) ........................ 10-2013-0001319

(51) Int. Cl.
| G06F 3/045 | (2006.01) |
| G06F 3/02 | (2006.01) |
| G06F 3/041 | (2006.01) |
| G06F 3/044 | (2006.01) |

(52) U.S. Cl.
CPC .............. *G06F 3/0227* (2013.01); *G06F 3/044* (2013.01); *G06F 3/0416* (2013.01)

(58) Field of Classification Search
CPC ...... G06F 3/0227; G06F 3/0416; G06F 3/044
USPC ............. 345/156, 173–174; 178/18.01–18.07
See application file for complete search history.

(56) References Cited

U.S. PATENT DOCUMENTS

| 2004/0140913 A1 | 7/2004 | Engelmann et al. |
| 2008/0129554 A1 | 6/2008 | Patel |
| 2009/0101417 A1* | 4/2009 | Suzuki .................. G06F 3/0418 178/18.06 |
| 2010/0033353 A1 | 2/2010 | Chang |
| 2012/0038572 A1 | 2/2012 | Kim et al. |
| 2012/0262407 A1 | 10/2012 | Hinckley et al. |

FOREIGN PATENT DOCUMENTS

WO    2012/115296 A1    8/2012

* cited by examiner

*Primary Examiner* — Rodney Amadiz
(74) *Attorney, Agent, or Firm* — Cha & Reiter, LLC

(57) ABSTRACT

Provided are an electronic apparatus for determining validity of touch key input and a method and apparatus for determining validity of touch key input for the electronic apparatus. The method includes determining whether a touch key is input to perform a preset function, determining whether a dummy key used to determine validity of input of the touch key is input, if determining that the touch key is input, and determining validity of input of the touch key based on whether the dummy key is input. According to the present invention, by determining whether touch key input is intended by a user, it is possible to prevent a function undesired by the user from being performed.

35 Claims, 16 Drawing Sheets

ELECTRONIC APPARATUS AND METHOD FOR DETERMINING VALIDITY OF TOUCH KEY INPUT USED FOR THE ELECTRONIC APPARATUS

CLAIM OF PRIORITY

This application claims priority under 35 U.S.C. §119(a) from Korean Patent Application Serial No. 10-2013-0001319, which was filed in the Korean Intellectual Property Office on Jan. 4, 2013, the entire disclosure of which is hereby incorporated by reference.

BACKGROUND

1. Technical Field

The present disclosure relates to a terminal device for determining validity of touch key input and a method and apparatus for determining validity of touch key input used for the terminal.

2. Description of the Related Art

Recently, with development of multimedia technologies and communication technologies, terminals such as smart phones and tablet Personal Computers (PCs) are becoming more and more popular.

The terminals have adopted touch keys for designs and convenience in use. Generally, input of a touch key may be determined by measuring a capacitance change. That is, the terminal determines whether the touch key is input by measuring a capacitance change generated in the touch key according to user's manipulation. For example, as illustrated in FIG. 1A, the terminal determines that a user input is generated (typically by contact with a user's finger or a specifically designed stylus) in a section 102 where capacitance is changed, and the terminal performs a function corresponding to the touch key. For accuracy of the manipulation, the terminal may determine that the touch key is input if a capacitance change exceeds a preset threshold value. For example, as illustrated in FIG. 1B, in the section 104 where the capacitance is changed by the preset threshold value or more, the terminal may determine that the touch key is input; in a section 106 where the capacitance is changed by the preset threshold value or less, the terminal may determine that the touch key is not input.

In general, the touch key is located adjacent to a display region, and as result, a touch key may be unintentionally input during user's manipulation, as will be described with reference to FIGS. 1C and 1D.

FIGS. 1C and 1D illustrate examples of a terminal 100 in which touch keys 122a and 122b and a physical key 121 are disposed in a side of a display 110.

As illustrated in FIG. 1C, when a user performs particular manipulation on the display 110, a user's hand may unintentionally presses the touch key 122b and thus a function corresponding to the touch key 122b would be performed. For example, a document generation program may be terminated without storing or saving a currently generated document.

Similarly, as illustrated in FIG. 1D, when the user manipulates the terminal 100 while holding the terminal 100 with both hands, the touch key 122b is often unintentionally input.

Therefore, a need exists for a method for rejecting touch key input that is not intended by the user.

The above information is presented as background information only to assist with an understanding of the present disclosure. No determination has been made, and no assertion is made, as to whether any of the above might be applicable as prior art with regard to the present invention.

SUMMARY

The present disclosure has been made to at least partially solve, alleviate, or remove at least one of problems and/or disadvantages described above.

Accordingly, aspects of the present disclosure provide a method for determining validity of touch key input.

Other objects to be provided in the present disclosure may be understood by embodiments described below.

According to one aspect, there is provided a method for operating an electronic apparatus, the electronic apparatus comprising a touch key, a dummy key and a controller, the method of operating the electronic apparatus including determining whether the touch key is input to perform a preset function, determining whether the dummy key is input by the controller, determining validity of input of the touch key based on whether the dummy key is input by the controller and performing the preset function when the input of the touch key is valid.

According to another aspect, there is provided an electronic apparatus configured to determine validity of touch key input, the electronic apparatus including a touch key for performing a preset function, a dummy key for determining validity of input of the touch key, a sensor unit for analyzing a signal received from the touch key and a signal received from the dummy key, and generating a key input signal indicating input of the touch key or the dummy key if determining that at least one of the touch key or the dummy key is input, and a controller for analyzing the key input signal received from the sensor unit, determining whether the dummy key is input if determining that the touch key is input, and determining validity of input of the touch key based on whether the dummy key is input, wherein the controller performs the preset function if it determines that the touch key input is valid.

According to another aspect, there is provided an electronic apparatus for determining validity of touch key input, the electronic apparatus including a display formed on a front surface of the electronic apparatus, at least one touch key formed on at least one side of the display and configured to sense an input, and at least one dummy key formed on at least one side of the display and configured to sense an input to determine whether the input of the at least one touch key is valid.

Other aspects, advantages, and salient features of the invention will become apparent to those skilled in the art from the attached claims and the following detailed description, which, taken in conjunction with the annexed drawings, discloses exemplary embodiments of the invention.

BRIEF DESCRIPTION OF THE DRAWINGS

The above and other aspects, features and advantages of a certain embodiment of the present invention will be more apparent from the following detailed description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described before, a touch key is generally located adjacent to a display region, and thus, a user may unintentionally press a touch key during manipulation on the display region. Moreover, touch keys are often positioned on a housing that encloses the display region, and when the user manipulates a terminal while holding the housing, a touch key is often unintentionally input.

The present invention provides a method and apparatus in which upon input of a touch key that is not intended by a user, a function corresponding to the touch key is not performed.

Hereinafter, embodiments of the present invention will be described with reference to the accompanying drawings.

Figure 1A:
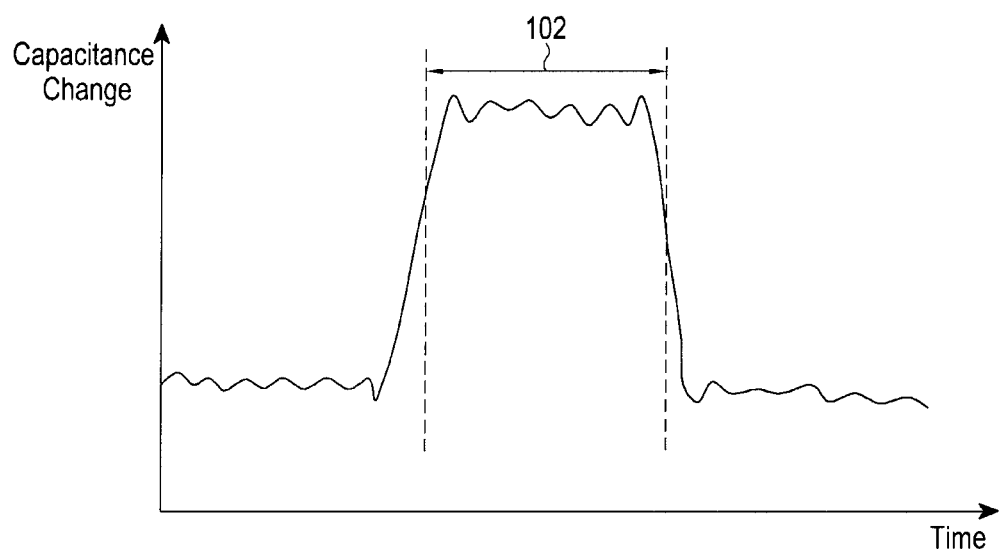
FIG. 1A and FIG. 1B are exemplary diagrams describing a method for determining touch key input by using a capacitance change.
Figure 1B:
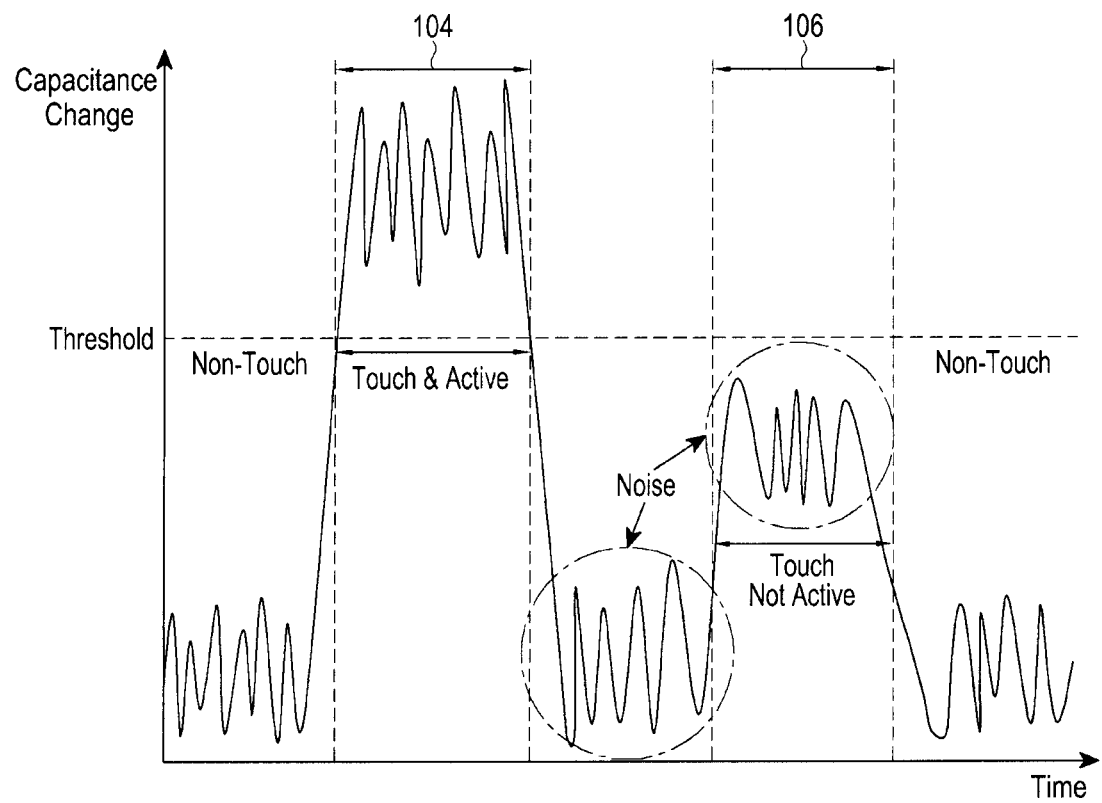
Figure 1C:
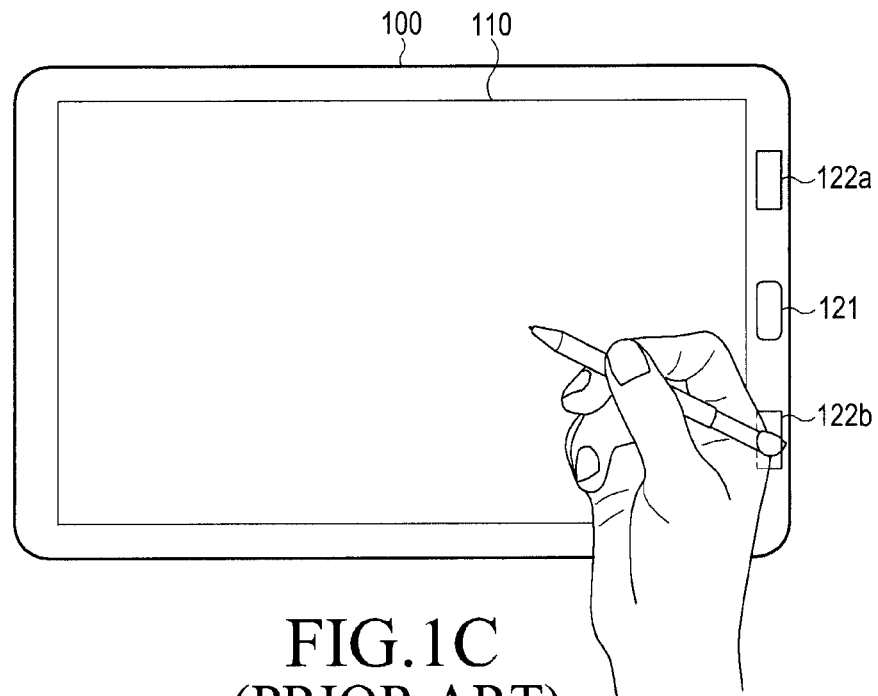
FIG. 1C and FIG. 1D are exemplary diagrams describing conventional techniques.
Figure 1D:
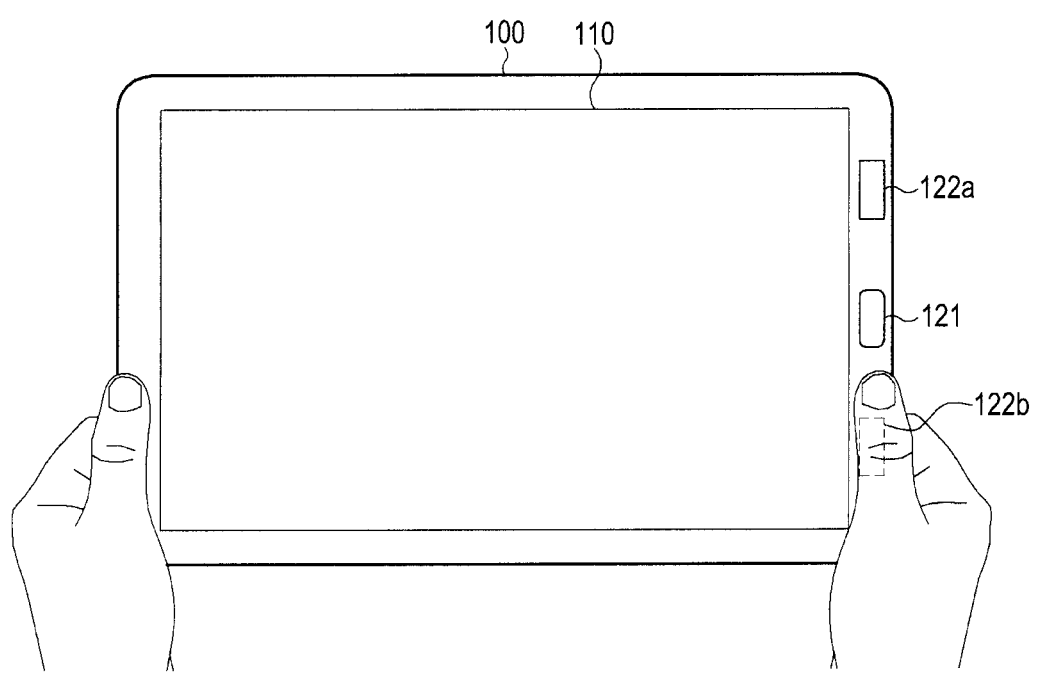
Figure 2:
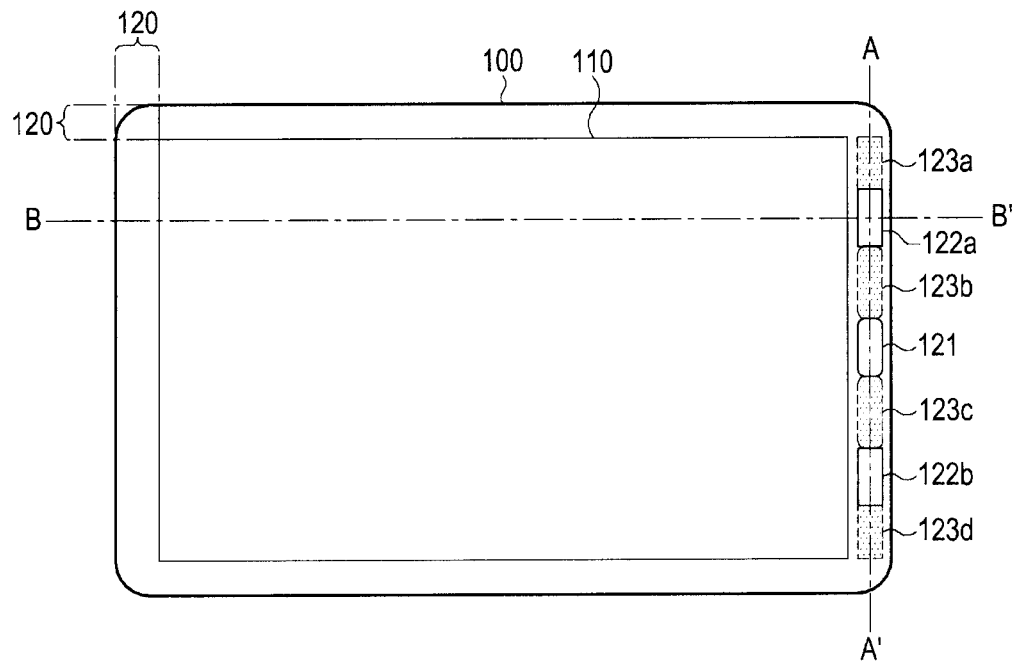
FIG. 2 is an exemplary diagram describing a terminal according to an embodiment of the present invention.

FIG. 2 is an exemplary diagram describing a terminal 100 according to an embodiment of the present invention.

Referring to FIG. 2, a terminal 100 according to an embodiment of the present invention preferably includes a display 110, a Black Matrix (BM) region 120 (for example, as described in U.S. Pat. No. 8,445,914, herein incorporated by reference in its entirety), and an apparatus for determining validity of touch key input (not illustrated).

A display 110 is positioned on a front surface of the terminal 100 and may include a touch screen.

On the BM region 120, touch keys 122a and 122b and dummy keys 123a, 123b, 123c, and 123d are disposed. According to an embodiment, a physical key 121 may be further disposed on the BM region 120.

The touch keys 122a and 122b are used to perform preset functions and send a sensed capacitance value to the apparatus for determining validity of touch key input.

The dummy keys 123a, 123b, 123c, and 123d are used to determine validity of input of the touch keys 122a and 122b, and may be disposed in adjacent to the touch keys 122a and 122b. Although the dummy keys 123a, 123b, 123c, and 123d are disposed on both sides of the touch keys 122a and 122b in FIG. 2, the dummy keys 123a, 123b, and 123c may be disposed at least one of on, under, to the left, and to the right of the touch keys 122a and 122b, or may be disposed to enclose the touch keys 122a and 122b. The dummy keys 123b and 123d may be disposed in adjacent to the physical key 121.

The apparatus for determining validity of touch key input determines validity of input of the touch keys 122a and 122b. In an embodiment, the apparatus for determining validity of touch key input determines validity of input of the touch keys 122a and 122b based on whether the dummy keys 123a, 123b, 123c and 123d are input, if the touch keys 122a and 122b are input. If the apparatus determines that input of the touch keys 122a and 122b is valid, it controls functions corresponding to the touch keys 122a and 122b to be performed. If the apparatus determines that input of the touch keys 122a and 122b is invalid, it controls the functions corresponding to the touch keys 122a and 122b not to be performed. That is, the apparatus for determining validity of touch key input determines whether input of the touch keys 122a and 122b is intended by the user and determines whether to perform the functions corresponding to the touch keys 122a and 122b.

Figure 3A:
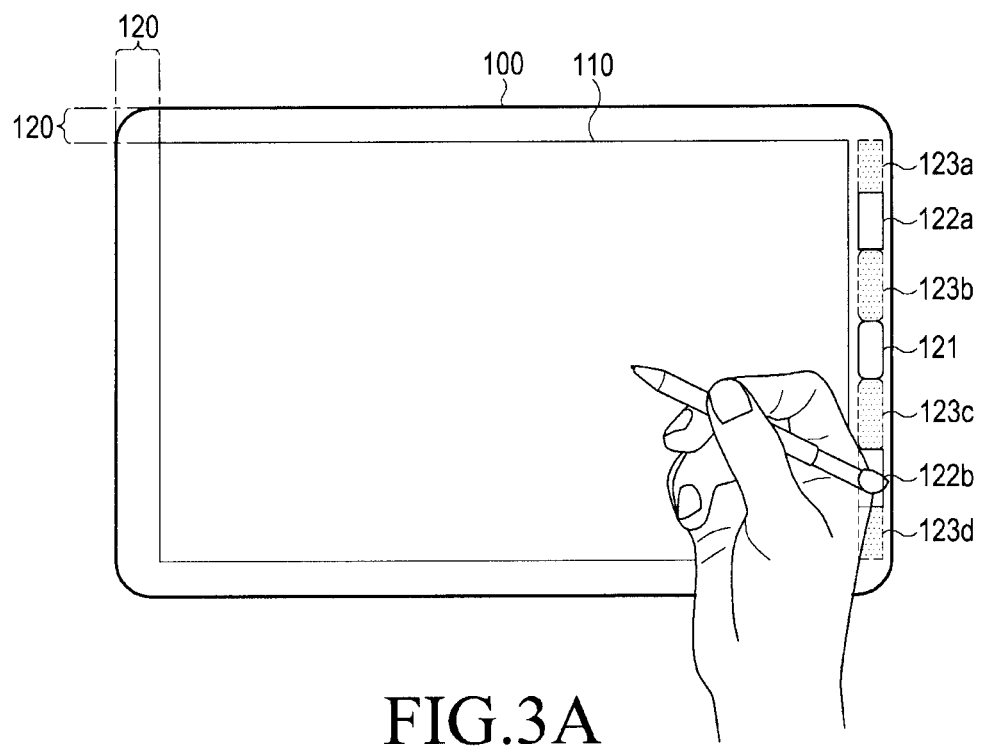
FIG. 3A and FIG. 3B are exemplary diagrams describing advantages according to an embodiment of the present invention.
Figure 3B:
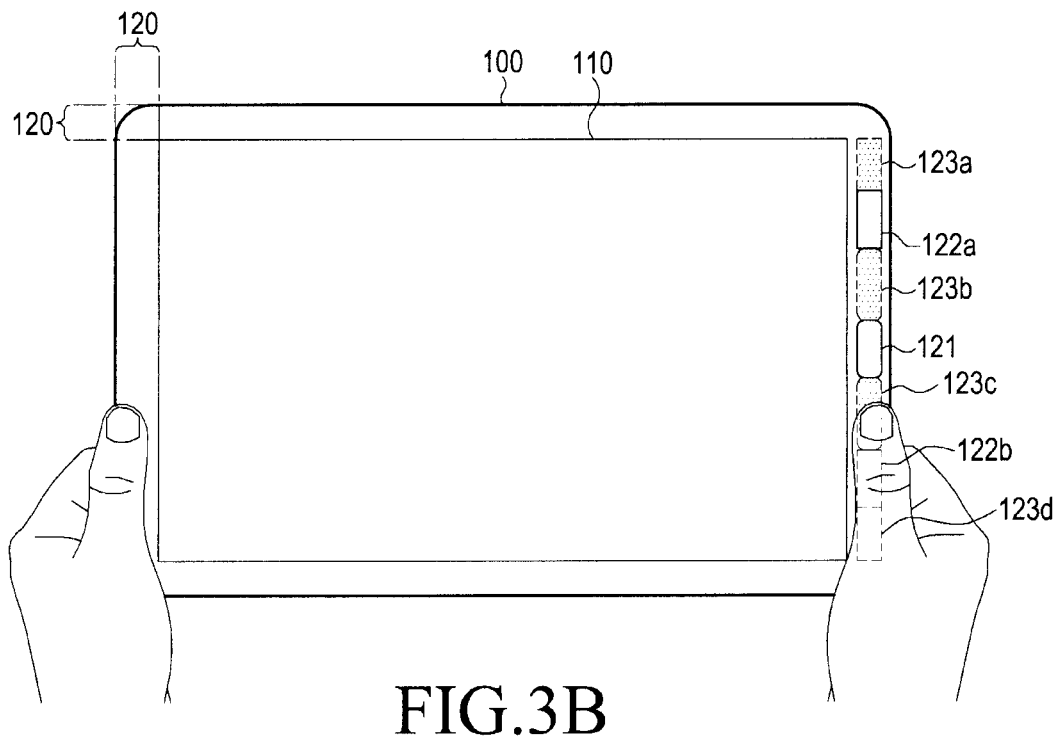

For example, when the user takes notes using an electronic pen as illustrated in FIG. 3A, or when the user mistakenly presses the touch key 122b during manipulation while holding the BM region 120 of the terminal 100 as illustrated in FIG. 3B, the dummy keys 123c and 123d located adjacent to the touch key 122b are also pressed. If the dummy keys 123c and 123d are input together with the touch key 122b, the apparatus for determining validity of touch key input determines that input of the touch key 122b is not intended by the user and thus controls a function corresponding to the touch key 122b not to be performed. More particularly, only when a touch key 122a and/or 122b is selected, without a dummy key 123a-d, does the terminal perform the corresponding function. If selection of a dummy key 123a-d is sensed at the same time as a touch key 122a-b, the terminal assumes the selection of the touch key 122a-b was unintentional, and the function corresponding to the touch key 122a-b is not performed.

According to an embodiment of the present invention described above, upon input of a touch key that is not intended by the user, a function corresponding to the touch key is not performed, i.e., the touch key is ignored, thus providing convenience to the user. While the terminal 100 according to an embodiment of the present invention has been described with reference to FIGS. 2 and 3, a structure of a dummy key according to an embodiment of the present invention will be described in more detail with reference to the related drawings.

Figure 4A:
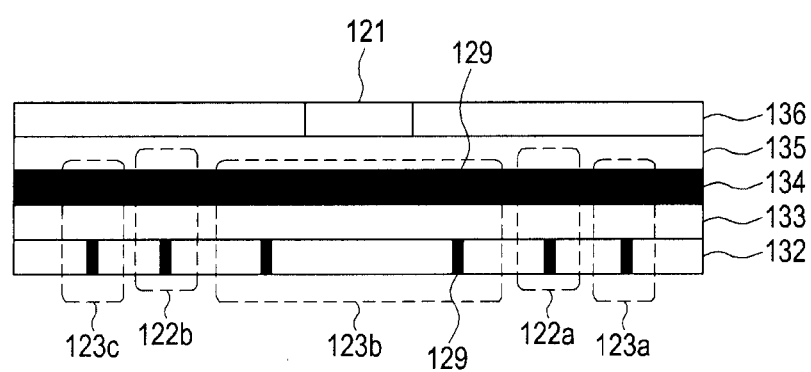
FIG. 4A, FIG. 4B, FIG. 4C, FIG. 4D and FIG. 4E are exemplary diagrams describing a dummy key according to an embodiment of the present invention.
Figure 4B:
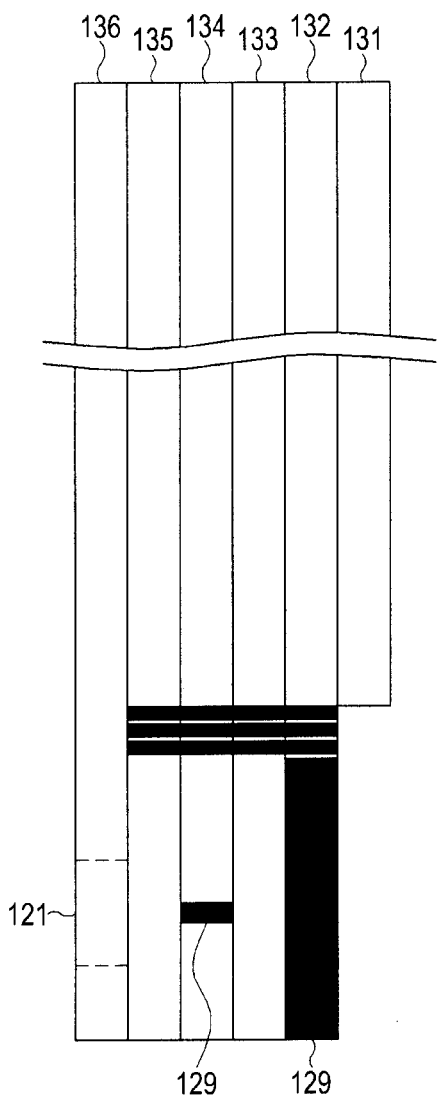
Figure 4C:
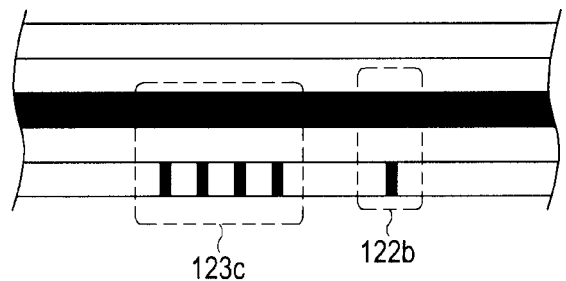
Figure 4D:
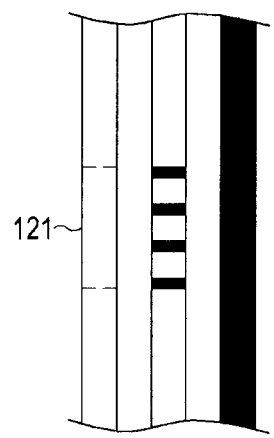

FIG. 4A is an exemplary diagram illustrating a cross section cut along a line A-A' of FIG. 2, and FIG. 4B is an exemplary diagram illustrating a cross section cut along a line B-B' of FIG. 2. While a Glass plus ITO Film plus ITO Film (GFF) scheme has been illustrated in FIGS. 4A through 4E, the present invention may also be applied to a G2 scheme in which a transmission channel and a reception channel are both formed on a glass layer or a G1F scheme in which a reception channel is inserted into the glass layer and a transmission channel is inserted into an ITO film layer.

Referring to FIGS. 4A through 4E, the terminal includes a transmission layer 132 and a reception layer 134 for sensing user input, a bezel layer 136 that forms the terminal's housing, bonding layers 133 and 135 for bonding between layers, and a display means 131.

Figure 4E:
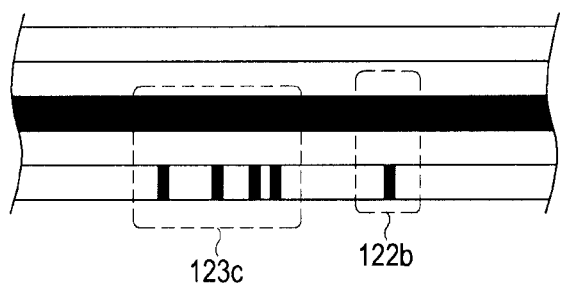

The transmission layer (transmission channel) 132 and the reception layer (reception channel) 134 include at least one channel line 129 for sensing user input. In FIGS. 4A and 4B, one channel line 129 is formed for each of the keys 122a, 122b, 123a, 123b, and 123c. According to the embodiment illustrated in FIGS. 4C and 4D, multiple channel lines 129 may be formed for each of the keys 122a, 122b, 123a, 123b, and 123c. When multiple channel lines 129 are formed for each key, each channel line 129 may be formed with different intervals from key to key. For example, as illustrated in FIG. 4E, the channel lines 129 may be formed with narrower intervals toward the touch key 122b. In this case, the accuracy of sensing user input may be improved with a few channel lines. In an embodiment, the channel line 129 may be formed of Indium Tin Oxide (ITO).

Figure 5A:
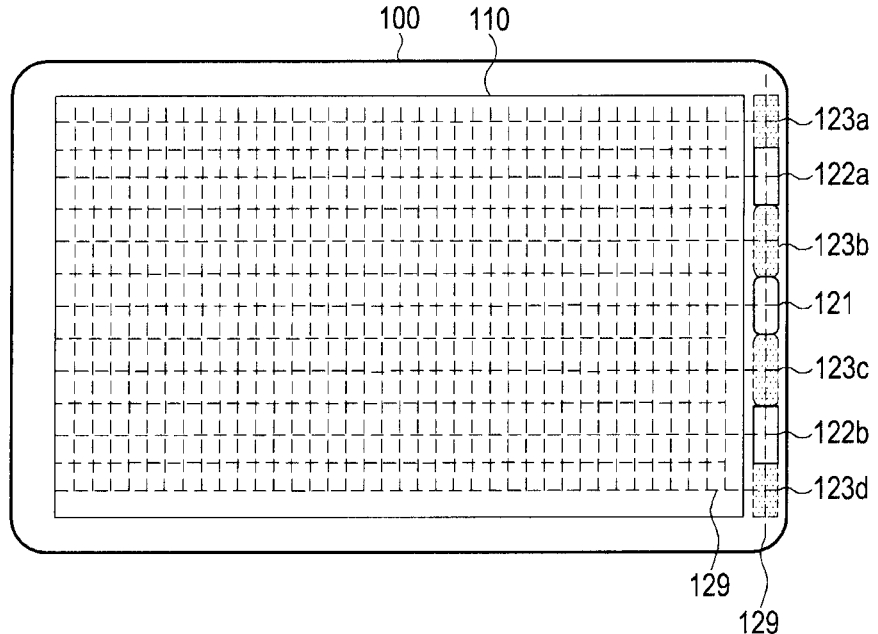
FIG. 5A and FIG. 5B are exemplary diagrams describing a channel line of a dummy key according to an embodiment of the present invention.

In one embodiment, the channel line 129 may extend from a channel line of the display region 110 as illustrated in FIG. 5A. For example, the channel line 129 extending from the display region 110 may be a channel line corresponding to one of a transmission channel and a reception channel. In this case, lines of the other channel are separately configured and are directly connected to the apparatus for determining validity of touch key input.

Figure 5B:
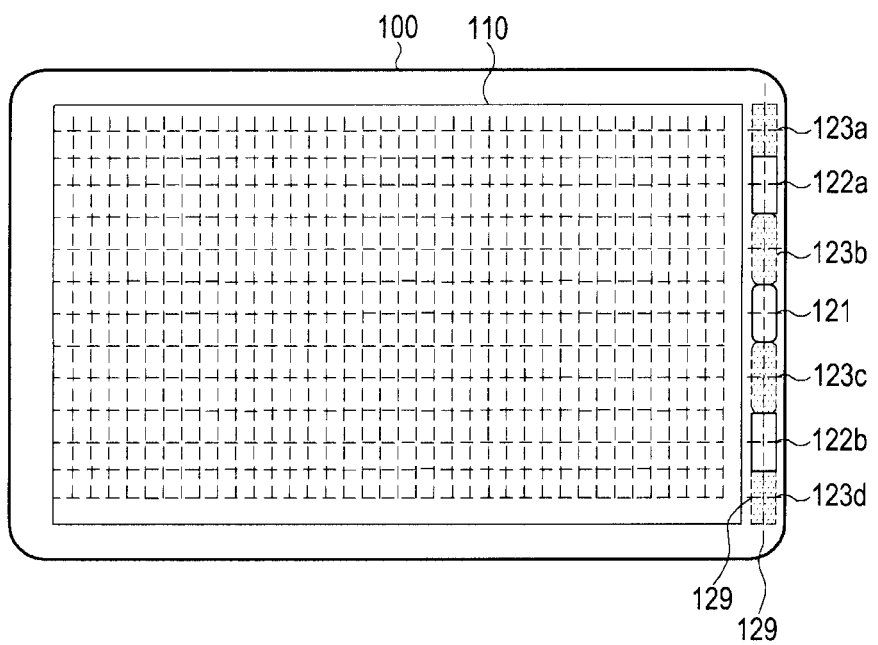

In one embodiment, the channel line 129 may be formed separately from a channel line of the display region 110 as illustrated in FIG. 5B. In this case, all channel lines are directly connected to the apparatus for determining validity of touch key input.

The display means 131 may be, for example, a Liquid Crystal Display (LCD).

Figure 6A:
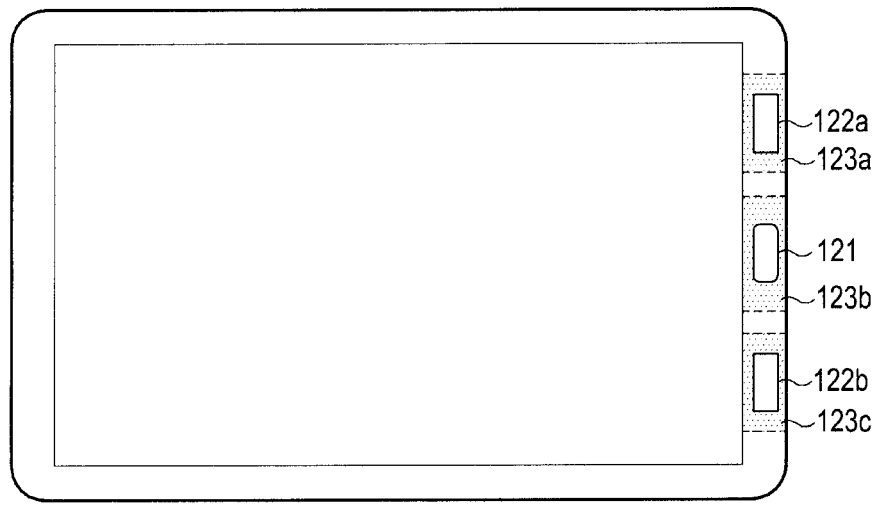
FIG. 6A is an exemplary diagram describing a dummy key according to another embodiment of the present invention.
Figure 6B:
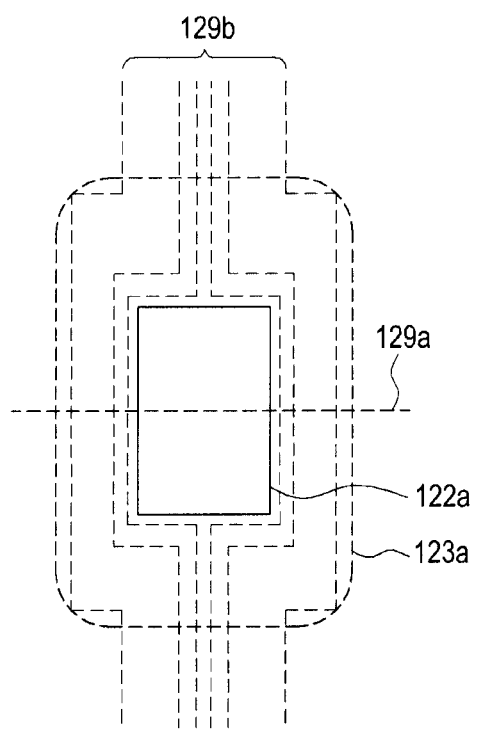
FIG. 6B is an exemplary diagram describing a channel line of a dummy key according to another embodiment of the present invention.

Although description and illustration have been made of a case where dummy keys are disposed in both sides of touch keys above, the dummy keys may be formed at least one of on, under, to the left, and to the right of the respective touch keys or may be formed to enclose the respective touch keys, as illustrated in FIGS. 6A and 6B.

Referring to FIG. 6A, the dummy keys 123a and 123c are formed to enclose the respective touch keys 122a and 122b. According to an embodiment, the dummy key 123b may also be formed around the physical key 121.

FIG. 6B is an exemplary diagram describing in more detail the touch key 122a and the dummy key 123a. While one transmission channel line 129a and multiple reception channel lines 129b are formed in FIG. 6B, each of the transmission channel and the reception channel may be formed with one channel line each or multiple channel lines each. As mentioned previously, intervals of respective channel lines may differ from one another, and for improvement of accuracy of touch recognition, the intervals may be narrower toward the touch key 122a as illustrated in FIG. 6B.

With reference to FIGS. 2 through 6B, the structure of the terminal according to an embodiment of the present invention has been made. Hereinafter, a description will be made of a method for determining validity of touch key input according to embodiments of the present invention with reference to the related drawings.

Figure 7:
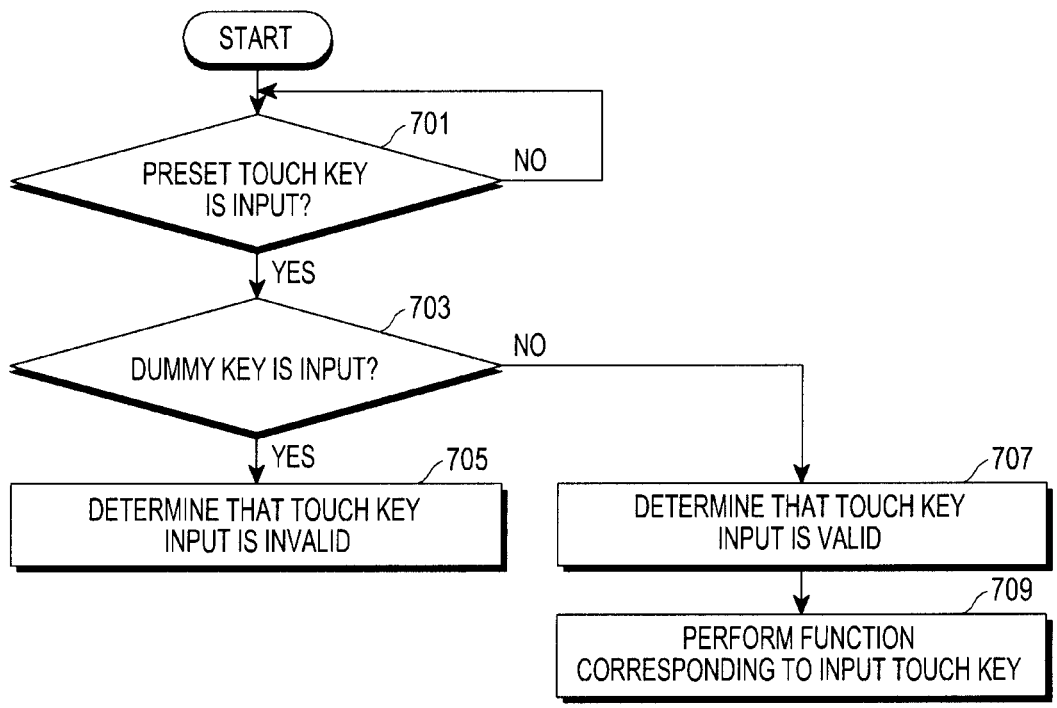
FIG. 7 is a flowchart describing a method for determining validity of touch key input according to an embodiment of the present invention.

FIG. 7 is a flowchart describing a method for determining validity of touch key input according to an embodiment of the present invention.

In step 701, the terminal determines whether a touch key is input to perform a preset function. If the terminal determines that the touch key is input, the terminal goes to step 703.

In step 703, the terminal determines whether a dummy key used to determine validity of the touch key is input. If the terminal determines that such a dummy key is input, the terminal goes to step 705; otherwise, if the terminal determines that the dummy key is not input, the terminal goes to step 707.

In step 705 to which the terminal proceeds after determining that the dummy key is input in step 703, the terminal determines that the touch key input is not valid. More particularly, if the touch key and the dummy key are input simultaneously, the terminal determines that the touch key input is not intended by the user and does not perform the function corresponding to the touch key in step 705.

In step 707 to which the terminal proceeds after determining that the dummy key is not input in step 703, the terminal determines that the touch key input is valid, and proceeds to step 709. More particularly, if the touch key is input and the dummy key is not input, the terminal determines that the touch key input is intended by the user in step 707.

In step 709, the terminal performs the function corresponding to the touch key.

It has been described that if the dummy key is input, the touch key input is determined to be invalid. However, according to an embodiment, even if the dummy key is input, the touch key input may be determined to be valid. For example, even when the touch key is input in a state where the dummy key has been input, if the touch key is input after elapse of a predetermined time from the initial input of the dummy key, the terminal may determine the touch key input to be valid. More particularly, the terminal may be configured such that the touch key is only ignored during a predetermined period after a dummy key input is detected, and after such predetermined period, the terminal will perform the function corresponding to the touch key (despite selection of a dummy key).

According to an embodiment of the present invention described above, if touch key input that is not intended by the user is sensed, a function corresponding to the touch key is not performed, i.e., the touch key is ignored, providing convenience to the user.

In the embodiment described with reference to FIGS. 2 through 7, when the dummy key and the touch key are input simultaneously, the function corresponding to the touch key is not performed. However, depending on a user's holding state, it may be necessary to perform a function corresponding to the touch key, as will be described with reference to FIGS. 8A and 8B.

Figure 8A:
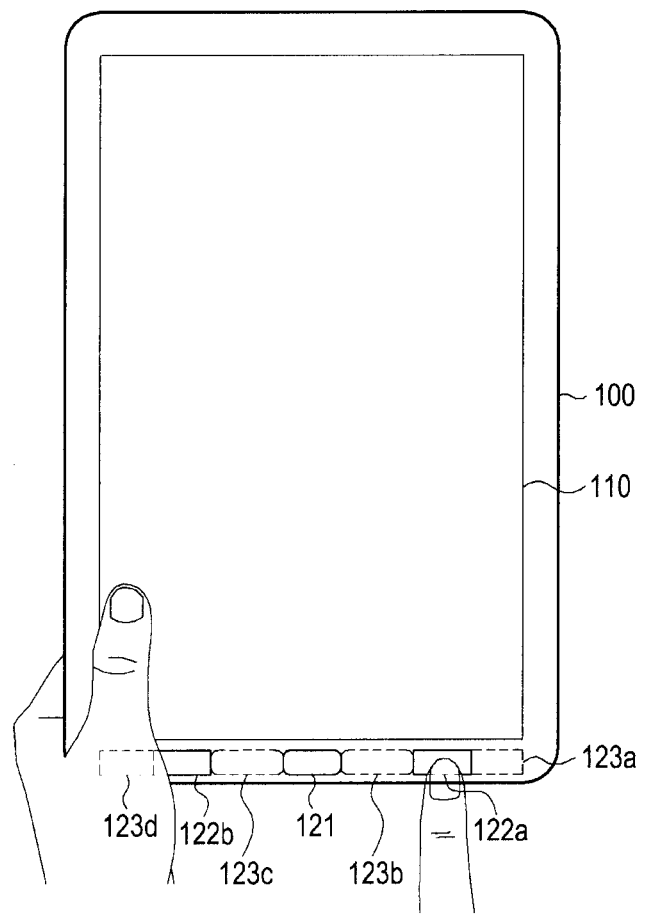
FIG. 8A and FIG. 8B are exemplary diagrams describing a method for determining validity of touch key input according to another embodiment of the present invention.

In a user's holding state as illustrated in FIG. 8A, a dummy key 123 is continuously input. In this situation, if the user presses the touch key 122a, the terminal determines input of the touch key 122a is intended by the user such that it may be necessary to perform a function corresponding to the touch key 122a.

Figure 8B:
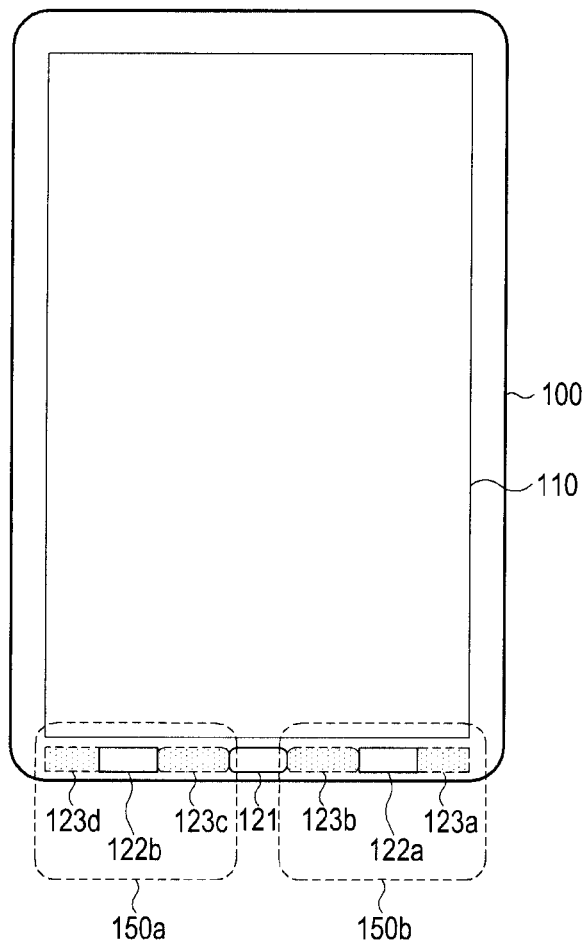

Accordingly, the terminal may separately recognize user input generated in a region 150a and user input generated in a region 150b, as illustrated in FIG. 8B. Such separate recognition may be achieved by separating channel lines for respective keys. In this case, the terminal may perform a function corresponding to a touch key if touch key input is generated in the region 150b even when dummy key input is generated in the region 150a.

In an embodiment, if a first action is used to perform a function corresponding to an input touch key in case of absence of dummy key input, the function corresponding to the input touch key may be performed if touch key input is generated by a second action in the region 150b when dummy key input is generated in the region 150a. In an embodiment, the first action may be a single-touch gesture and the second action may be a double-touch gesture.

Figure 9A:
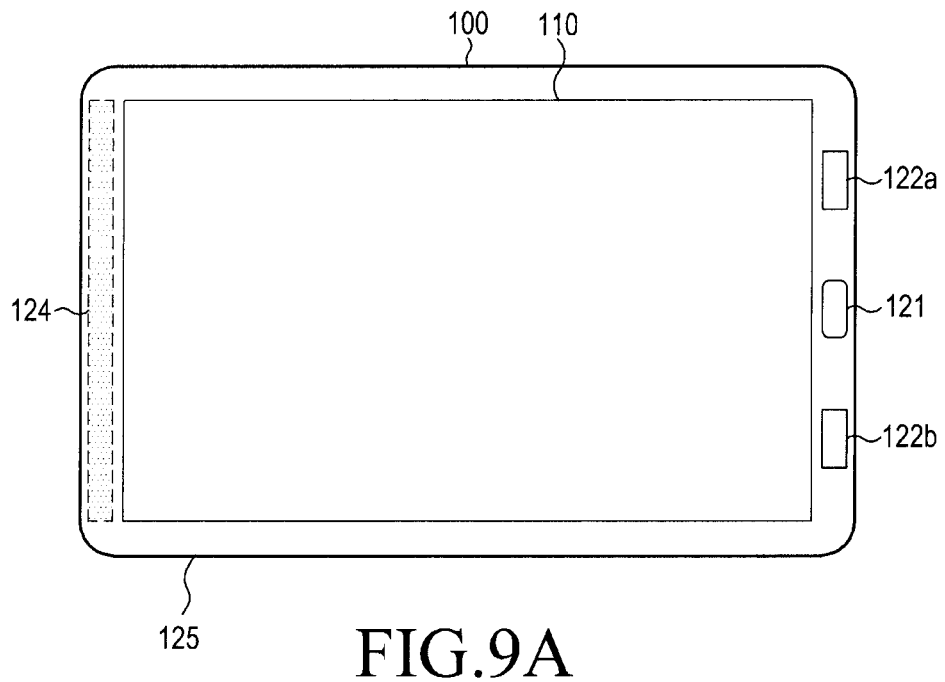
FIG. 9A and FIG. 9B are exemplary diagrams describing a dummy key according to another embodiment of the present invention.

Meanwhile, as illustrated in FIG. 9A, a dummy key 124 may be formed in an area of a bezel opposite the touch keys with respect to a display region. Also in this case, as described with reference to FIGS. 8A and 8B, if one of the touch keys 122a and 122b is input even when the dummy key 124 is input, the terminal may perform a function corresponding to the input touch key.

In one embodiment, if a first action is used to perform a function corresponding to an input touch key in case of absence of dummy key input, the function corresponding to the input touch key may be performed if touch key input is generated by the second action when the dummy key 124 is input. In an embodiment, the first action may be a single-touch gesture and the second action may be a double-touch gesture. More particularly, the terminal may be configured, in response to predetermined circumstances, to ignore selection of a dummy key, and perform the function corresponding to the input key (irrespective of selection of a dummy key).

Figure 9B:
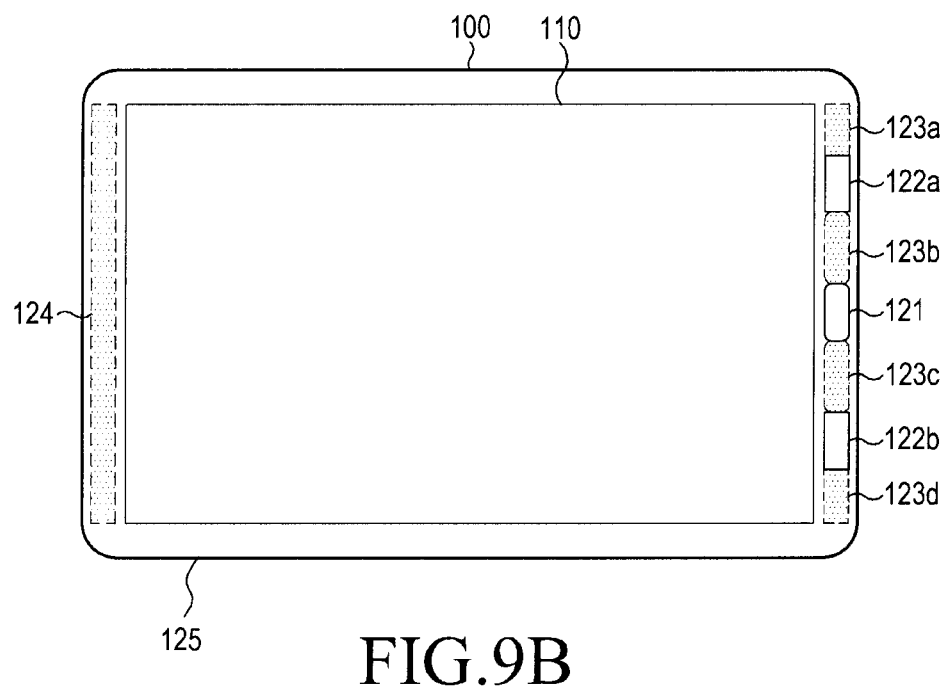

As illustrated in FIG. 9B, the dummy key 124 may be formed both in regions adjacent to the touch keys 122a and 122b and in a region of the bezel opposite the touch keys 122a and 122b with respect to the display 110.

The structure of the terminal according to another embodiment of the present invention has been described so far with reference to FIGS. 8A through 9B. Hereinafter, a description will be made of a method for determining validity of touch key input according to another embodiment of the present invention.

Figure 10:
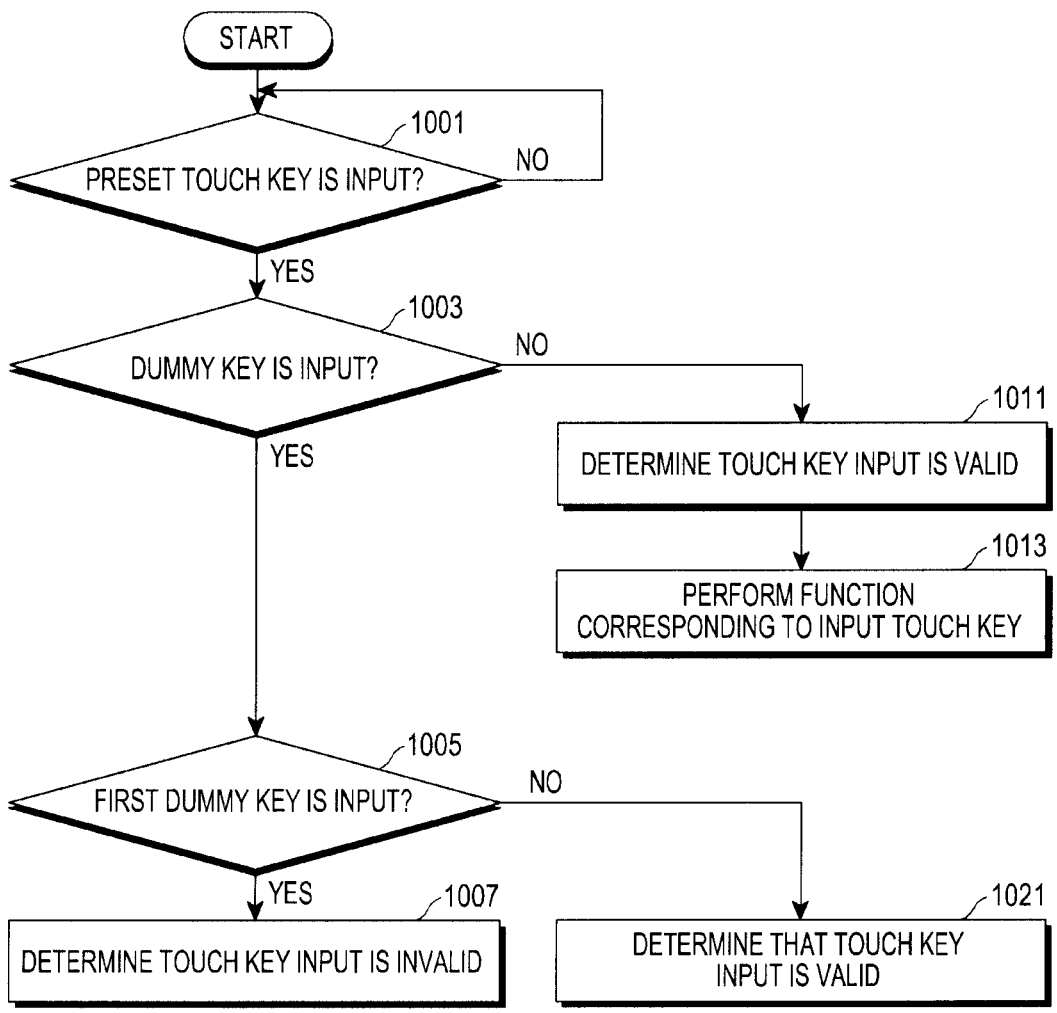
FIG. 10 and FIG. 11 are flowcharts describing a method for determining validity of touch key input according to another embodiment of the present invention.

FIG. 10 is a flowchart describing a method for determining validity of touch key input according to another embodiment of the present invention.

Steps 1001, 1003, 1011, and 1013 of FIG. 10 are the same as steps 701, 703, 707, and 709 of FIG. 7 and thus will not be described in detail.

In step 1005, the terminal determines whether an input dummy key is a first dummy key, and proceeds to step 1007 if the input dummy key is the first dummy key; otherwise, if the input dummy key is not the first dummy key, the terminal proceeds to step 1021. It is noted that here "first" and "second" are not used to indicate chronological (dummy) key touches, but to distinguish between different dummy keys.

Herein, the first dummy key may be the dummy keys 123a and 123b that are formed in adjacent to the touch key 122a, as described with reference to FIGS. 8A through 9B.

In step 1007 to which the terminal proceeds after determining that the input dummy key is the first dummy key in step 1005, the terminal determines that touch key input is invalid.

In a step to which the terminal proceeds after determining that the input dummy key is not the first dummy key in step 1005, that is, in step 1021 to which the terminal proceeds after determining that the input dummy key is a second dummy key that is not a dummy key formed in adjacent to a touch key, the terminal determines that touch key input is valid, and performs a function corresponding to the input touch key. More particularly, by separating the dummy keys into a first dummy key and a second dummy key, the terminal can respond differently depending upon which dummy key is input.

Herein, the second dummy key may be the dummy key 123c or 123d that is not adjacent to the touch key 122a as described with reference to FIGS. 8A and 8B, or the dummy key 124 that is formed opposite the touch key with respect to the display 110.

Meanwhile, in this embodiment, if the dummy key input together with the touch key is the second dummy key instead of the dummy key (i.e., the first dummy key) that is adjacent to the touch key, the terminal may determine touch key input to be valid when the touch key input is generated by a preset action, as will be described with reference to FIG. 11.

Figure 11:
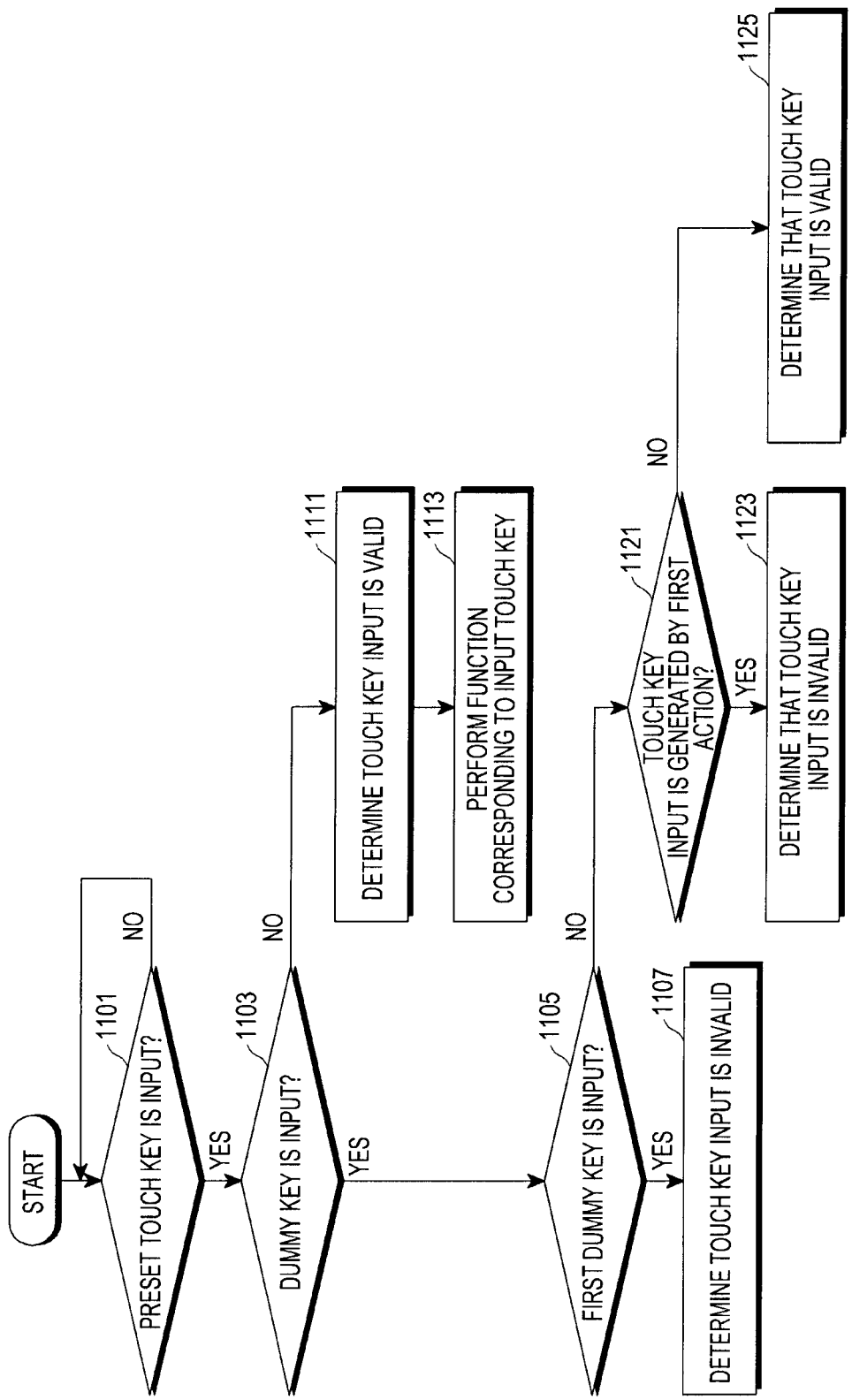

FIG. 11 is a flowchart describing a method for determining validity of touch key input according to another embodiment of the present invention.

Steps 1101 through 1113 of FIG. 11 are the same as steps 1001 through 1013 of FIG. 10 and thus will not be described in detail.

In step 1121, if the terminal determines that touch key input is generated by the first action, for example, the single-touch gesture, the terminal proceeds to step 1123; otherwise, if the terminal determines that the touch key input is not generated by the first action, the terminal goes to step 1125. Again, "first" and "second" actions do not refer to chronological orders of actions, but to a first and second type of action.

In step 1121, if the terminal determines that touch key input is generated by the first action, for example, the single-touch gesture, the terminal determines the touch key input to be invalid in step 1123. For example, a first action can be, what is known as a "long press", where the key is depressed and not quickly released. Such a long press may result from a user holding the terminal in a particular orientation or from resting his palm or other part of his hand on the terminal. As a result, the long press action may indicate that the input of the touch key was intended by the user and not an unintentional input.

In step 1125 to which the terminal proceeds after determining that the touch key input is not generated by the first action, the touch key input is generated by the second action, for example, the double-touch gesture, the terminal determines the touch key input to be valid and performs a function corresponding to the input touch key.

According to an embodiment described with reference to FIGS. 8A through 11, by analyzing user's intention regarding touch key input in detail, it is determined whether to perform a function corresponding to the input touch key, thus providing convenience to the user.

In the following description, a terminal device to which the embodiments of the present invention described with reference to FIGS. 2 through 11 are applied will be described.

Figure 12:
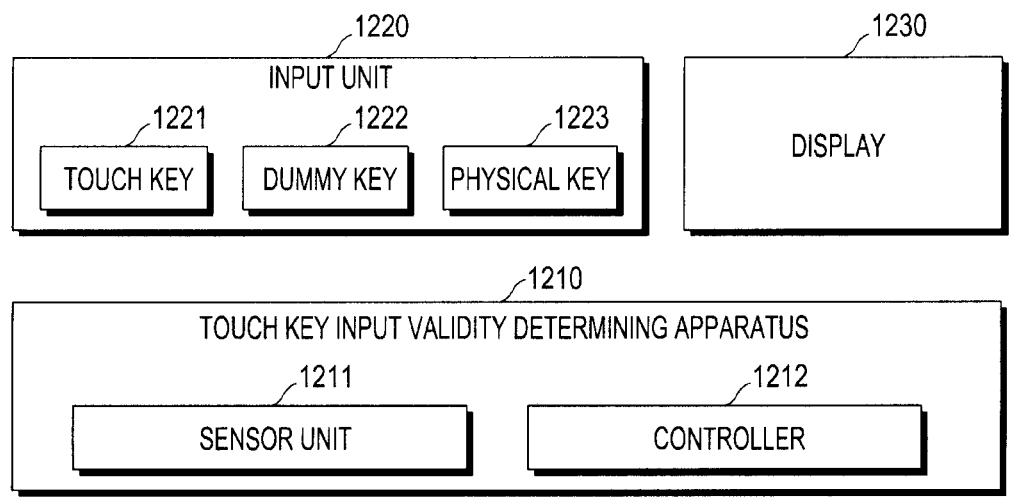
FIG. 12 is a block diagram describing a terminal device to which the embodiments of the present invention are applied.

FIG. 12 is a block diagram illustrating a terminal device in accordance with described embodiments of the present invention.

Referring to FIG. 12, the electronic apparatus according to the embodiment of the present disclosure is assumed to be a terminal device, but the electronic apparatus according to the embodiment of the present disclosure is not limited to the terminal device. An example of a terminal device according to an embodiment of the present disclosure may be a conventional feature phone, an electronic apparatus (e.g., a smart phone or a tablet) driven by Bada, Tizen, Windows series (e.g., Windows 8), iOS, Android, or the like. Additionally, the terminal device according to an embodiment of the present disclosure may be a notebook computer, a digital camera, or a video phone, a Personal Digital Assistant (PDA), a portable game console, an MP3 player, a Portable/Personal Multimedia Player (PMP), a handheld e-book, a tablet computer, a Global Positioning System (GPS) navigation, or the like. At this point, it is obvious to those skilled in the art that the terminal device according to an embodiment of the present disclosure is not limited to the apparatuses described above. Referring to FIG. 12, the terminal device may include a touch key input validity determining apparatus 1210, an input unit 1220, and a display 1230.

The touch key input validity determining apparatus 1210 may include a sensor unit 1211 and a controller 1212.

The sensor unit 1211 analyzes signals received from a touch key 1221 for performing a preset function and a dummy key 1222 for determining validity of input of the touch key 1221, and if determining that at least one of the touch key 1221 and the dummy key 1222 is input, generates and delivers a key input signal indicating input of the key to the controller 1212.

After the sensor unit 1211 analyzes the signals received from the keys 1221 and 1222, if a signal level corresponding to a key is changed by a preset threshold value or more, the sensor unit 1211 determines that the key is input, and generates and delivers a key input signal indicating input of the key to the controller 1212. A first threshold value for determining whether the touch key 1221 is input and a second threshold value for determining whether the dummy key 1222 is input may be set differently. In an embodiment, to improve sensitivity of the touch key 1221, the first threshold value may be set smaller than the second threshold value. If a capacitance type is used, the signal level may be a capacitance value.

The controller 1212 analyzes the key input signal received from the sensor unit 1211, determines whether the dummy key 1222 is input if determining that the touch key 1221 is input, and determines validity of input of the touch key 1221 based on whether the dummy key 1222 is input.

For example, the controller 1212 may analyze the signals received from the sensor unit 1211 and determine that input of the touch key 1221 is valid if determining that the touch key 1221 is input but the dummy key 1222 is not input. This case may correspond to, for example, when the user intentionally presses the touch key 1221.

The controller 1212 may also analyze the signals received from the sensor unit 1211 and determine that input of the touch key 1221 is not valid if determining that both the touch key 1221 and the dummy key 1222 are input. This case may correspond to, for example, when the user unintentionally presses the touch key 1221 and the dummy key 1222 together.

If the controller 1212 determines that the dummy key 1222 is input, the controller 1212 may further determine whether the dummy key is a first dummy key, e.g., that is adjacent to the touch key 1221 or a second dummy key, e.g., that is not adjacent to the touch key 1221. If the controller 1212 determines that the input dummy key 1222 is the first dummy key, the controller 1212 determines that input of the touch key 1221 is invalid; otherwise, if the controller 1212 determines that the input dummy key 1222 is the second dummy key, the controller 1212 may determine input of the touch key 1221 to be valid.

If the controller 1212 determines that the input dummy key 1222 is the second dummy key and input of the touch key 1221 is generated by a first action, for example, the single-touch gesture, the controller 1212 may determine input of the touch key to be invalid. If the controller 1212 determines that the input dummy key 1222 is the second dummy key and input of the touch key 1221 is generated by a second action, for example, the double-touch gesture, the controller 1212 may determine input of the touch key 1221 to be valid.

The input unit 1220 may include at least one touch key 1221 and at least one dummy key 1222, and may further include at least one physical key 1223 depending on an embodiment.

The touch key 1221 may be configured to use a capacitance type, and delivers a sensing value corresponding to user input to the touch key input validity determining apparatus 1210.

The dummy key 1222 may also be configured to use the capacitance type, and delivers a sensing value corresponding to user input to the touch key input validity determining apparatus 1210. The sensing value delivered from the dummy key 1222 is used to determine validity of input of the touch key 1221.

The display 1230 may be a touch screen.

The above-described embodiments of the present invention may be implemented in various arbitrary methods. For example, the embodiments of the present invention may be implemented using hardware, software, or a combination thereof. When the embodiments of the present invention are implemented with software, it may be implemented as software executed on one or more processors that use various operating systems or platforms. Additionally, such software may be generated using an arbitrary one of multiple proper programming languages and may be compiled into executable machine code or intermediate code that is executed on a framework or a virtual machine.

When the embodiments of the present invention are executed on one or more processors, they may be implemented with a processor-readable medium (for example, a memory, a floppy disk, a hard disk, a compact disc, an optical disc, or a magnetic tape) having recorded thereon one or more programs for executing a method for implementing the above-described various embodiments of the present invention.

As is apparent from the foregoing description, by determining whether touch key input is intended by the user, it may be possible to prevent a function that is not intended by the user from being performed.

The apparatuses and methods of the disclosure can be implemented in hardware, firmware or via the execution of software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se.

While the present invention has been particularly illustrated and described with reference to certain embodiments thereof, various modifications or changes can be made without departing from the scope of the present invention. Therefore, the scope of the present invention is not limited to the described embodiments, should be defined by the scope of the following claims and any equivalents thereof.

What is claimed is:

1. An electronic apparatus for determining validity of touch key input, the electronic apparatus comprising: a display formed on a front surface of the electronic apparatus; at least one touch key formed on at least one side of the display, and configured to sense an input; and at least one dummy key formed on at least one side of the display, and configured to sense an input to determine whether the input of the at least one touch key is valid, wherein the at least one dummy key comprises multiple transmission channel lines or multiple reception channel lines, wherein an interval of the multiple channel lines becomes narrower toward the at least one touch key.

2. The electronic apparatus of claim 1, wherein the dummy key comprises at least one first dummy key located adjacent to at least one touch key, and the at least one first dummy key is formed at least one of on, under, to a left, and to a right of the at least one touch key.

3. The electronic apparatus of claim 1, wherein the dummy key comprises at least one second dummy key formed opposite the at least one touch key with respect to the display.

4. The electronic apparatus of claim 1, wherein at least one of the multiple channel lines of the at least one dummy key extends from a channel line of the display.

5. The electronic apparatus of claim 1, wherein at least one of the multiple channel lines of the at least one dummy key is configured separately from a channel line of the display.

6. The electronic apparatus of claim 1, further comprising a controller including:
 a touch key input validity determining apparatus configured to determine whether the dummy key is input if determining that the touch key is input after analyzing a signal received from the at least one touch key and a signal received from the at least one dummy key, and determine validity of input of the touch key based on whether the dummy key is input.

7. The electronic apparatus of claim 6, wherein the touch key input validity determining apparatus determines that input of the touch key is valid when determining that the dummy key is not input.

8. The electronic apparatus of claim 6, wherein the touch key input validity determining apparatus determines that input of the touch key is invalid when the controller determines that the dummy key is input.

9. The electronic apparatus of claim 6, wherein the touch key input validity determining apparatus analyzes the signals received from the dummy key and the touch key, and determines that the dummy key or the touch key is input when a signal level for the dummy key or the touch key is changed by a predetermined threshold value or more.

10. The electronic apparatus of claim 9, wherein a first threshold value for determining whether the touch key is input and a second threshold value for determining whether the dummy key is input are different.

11. The electronic apparatus of claim 10, wherein the first threshold value is smaller than the second threshold value.

12. The electronic apparatus of claim 9, wherein the signal level is a capacitance value.

13. The electronic apparatus of claim 6, wherein the touch key input validity determining apparatus determines that input of the touch key is invalid when determining that a first dummy key is input, and determines input of the touch key is valid if determining that a second dummy key is input.

14. The electronic apparatus of claim 6, wherein the touch key input validity determining apparatus determines that input of the touch key is invalid when determining that a first dummy key is input, determines that input of the touch key is invalid if determining that a second dummy key is input and the touch key is input by a predetermined first action, and determines that input of the touch key is valid if determining that the second dummy key is input and the touch key is input by a predetermined second action.

15. The electronic apparatus of claim 14, wherein the first action is a single-touch gesture and the second action is a double-touch gesture.

16. An electronic apparatus configured to determine validity of touch key input, comprising: a touch key for performing a preset function; a dummy key for determining validity of input of the touch key; a sensor unit for analyzing a signal received from the touch key and a signal received from the dummy key, and generating a key input signal indicating input of the touch key or the dummy key when determining that at least one of the touch key or the dummy key is input; and a controller configured to analyze the key input signal received from the sensor unit, determine whether the dummy key is input if determining that the touch key is input, and determining validity of input of the touch key based on whether the dummy key is input, wherein the controller is configured to perform the preset function when the touch key input is valid, wherein the dummy key comprises multiple transmission channel lines or multiple reception channel lines, wherein an interval of the multiple channel lines becomes narrower toward the at least one touch key.

17. The electronic apparatus of claim 16, wherein the controller is configured to determine that input of the touch key is valid when the controller determines that the dummy key is not input.

18. The electronic apparatus of claim 16, wherein the controller is configured to determine that input of the touch key is invalid when the controller determines that the dummy key is input.

19. The electronic apparatus of claim 16, wherein the sensor unit is configured to analyze signals received from the dummy key and the touch key, and to determine that the dummy key or the touch key is input when a signal level for the dummy key or the touch key is changed by at least a predetermined threshold value.

20. The electronic apparatus of claim 19, wherein a first threshold value for determining whether the touch key is input and a second threshold value for determining whether the dummy key is input are different.

21. The electronic apparatus of claim 20, wherein the first threshold value is smaller than the second threshold value.

22. The electronic apparatus of claim 19, wherein the signal level is a capacitance value.

23. The electronic apparatus of claim 16, wherein the controller is configured to determine that input of the touch key is invalid when determining that a first dummy key is input, and to determine input of the touch key is valid if determining that a second dummy key is input.

24. The electronic apparatus of claim 16, wherein the controller is configured to determine that input of the touch key is invalid when the controller that a first dummy key is input, the controller determines that input of the touch key is invalid if determining that a second dummy key is input and the touch key is input by a predetermined first action, and to determine that input of the touch key is valid if the controller determines that the second dummy key is input and the touch key is input by a predetermined second action.

25. The electronic apparatus of claim 24, wherein the first action is a single-touch gesture and the second action is a double-touch gesture.

26. A method for operating an electronic apparatus, the electronic apparatus comprising a touch key, a dummy key, and a controller, the method comprising: determining whether the touch key is input by the controller to perform a preset function; determining whether the dummy key is input by the controller; determining validity of input of the touch key based on whether the dummy key is input by the controller; and performing the preset function when the input of the touch key is valid, wherein the dummy key comprises multiple transmission channel lines or multiple reception channel lines, wherein an interval of the multiple channel lines becomes narrower toward the at least one touch key.

27. The method of claim 26, wherein determining validity of input of the touch key comprises determining that input of the touch key is valid when determining that the dummy key is not input.

28. The method of claim 26, wherein determining validity of input of the touch key comprises determining that input of the touch key is invalid when determining that the dummy key is input.

29. The method of claim 26, wherein at least one of determining whether the touch key is input and determining whether the dummy key is input comprises determining that the touch key or the dummy key is input in response to a signal level for key changing by at least preset threshold value.

30. The method of claim 29, wherein a first threshold value for determining whether the touch key is input and a second threshold value for determining whether the dummy key is input are different from each other.

31. The method of claim 30, wherein the first threshold value is smaller than the second threshold value.

32. The method of claim 29, wherein the signal level is a capacitance value.

33. The method of claim 26, wherein determining whether the touch key is input comprises determining that input of the touch key is invalid when determining that a first dummy key is input, and determining input of the touch key is valid if determining that a second dummy key is input.

34. The method of claim 26, wherein determining whether the touch key is input comprises:
 determining that input of the touch key is invalid when determining that a first dummy key is input,
 determining that input of the touch key is invalid when determining that a second dummy key is input and the touch key is input by a predetermined first action, and
 determining that input of the touch key is valid when determining that the second dummy key is input and the touch key is input by a predetermined second action.

35. The method of claim 34, wherein at least one of the first action and the second action is a single-touch gesture and the second action is a double-touch gesture.

* * * * *